Patented July 22, 1952

2,604,487

UNITED STATES PATENT OFFICE 2,604,487

ORGANOSILICON OILS

Charles A. Burkhard, Alplaus, N. Y., assignor to General Electric Company, a corporation of New York No Drawing. Application May 21, 1951,
Serial No. 227,505

3 Claims. (Cl. 260—448.2)

The present invention relates to organosilicon oils comprising chemical compounds of silicon, oxygen, sulfur, carbon and hydrogen. It is more specifically concerned with oily compositions comprising organosilicon compounds of the unit structure.

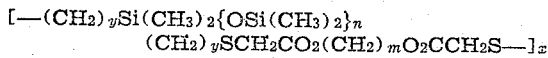

wherein $n$ is a number from 0 to 10, preferably 0 or 1, $m$ is an integer equal to at least 2, and preferably from 2 to 6, $y$ is equal to 2 or 3, and $x$ is an integer equal to at least 1. It will be noted that the compounds are particularly characterized by the presence in the unit structure of the thioether linkage, the carboxylic acid group and a dimethylsilylene group. The present application is a continuation-in-part of my copending application S. N. 111,093 filed August 18, 1949, and now abandoned and assigned to the same assignee as the present invention.

The compounds and oils of the present invention are prepared by effecting reaction between (1) a diester of thioglycolic acid and a dihydric alcohol having the formula

wherein $m$ is an integer equal to at least 2, preferably 2 to 6, and (2) a dialkenyl silane or siloxane of the formula

wherein $R^1$ represents a terminally unsaturated alkenyl radical, e. g., a vinyl or allyl radical and $n$ is a number from 0 to 10, preferably 0 or 1. A representative compound of (1) when $m$ is equal to 2 is ethylene bisthioglycolate prepared from thioglycolic acid and ethylene glycol and representative compounds of (2) are diallyldimethylsilane, divinyldimethylsilane, sym diallyltetramethyldisiloxane ($n=1$) and sym divinylhexamethyltrisiloxane ($n=2$).

The reaction appears to proceed exclusively by the addition of the S—H bond to the alkenyl radical as no sulfur is lost during the reaction and the products do not react with standard iodine solution indicating that the S—H bond has disappeared.

The oily products of the present invention can be used as lubricating oils, hydraulic fluids and as lubricity additives for petroleum oils or other organosilicon oils. They may also be employed as plasticizers for organo silicon resins and elastomers and polyvinyl halide resins.

In order that those skilled in the art better may understand how the present invention may be carried into effect, the following illustrative examples are given:

*Example 1.*—Ethylene bisthioglycolate was mixed with an equimolar quantity of diallyldimethylsilane and a small amount of benzoyl peroxide added to initiate the reaction. After shaking, the mixture was allowed to stand for a few hours. The product was a viscous oil having the unit structure

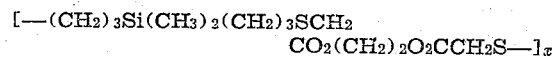

where $x$ equals at least 1. Analysis for sulfur gave 18.65% as compared with a calculated content of 18.29.

*Example 2.*—The process of Example 1 was repeated employing diallyltetramethyldisiloxane,

in place of the diallyldimethylsilane. The product was a high molecular weight oil of about the same viscosity as that of Example 1 and having the unit structure

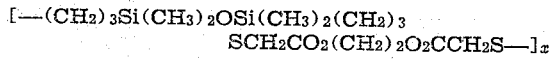

and a sulfur analysis of 10.05, calculated 10.6.

Other compounds or oils of the present invention are prepared by reacting the higher divinyl or diallyl polymethyl siloxanes with either ethylene bisthioglycolate or other diesters of thioglycolic acid and a higher dihydric alcohol such as trimethylene glycol, etc.

What I claim as new and desire to secure by Letters Patent of the United States is:

1. An organosilicon oil comprising the unit structure

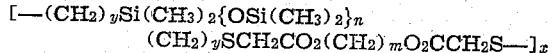

wherein $n$ is a number from 0 to 10, $m$ is an integer equal to at least 2, $y$ is one of the integers, 2, 3, and $x$ is an integer equal to at least 1.

2. An organosilicon oil comprising the unit structure

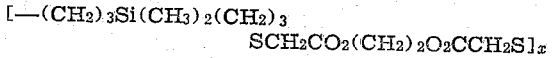

where $x$ equals at least 1.

3. An organosilicon oil comprising the unit structure

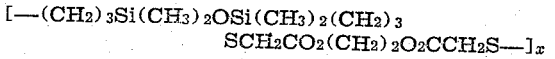

and $x$ is an integer equal to at least 1.

CHARLES A. BURKHARD.

No references cited.